United States Patent
Lin et al.

(10) Patent No.: US 8,045,702 B2
(45) Date of Patent: Oct. 25, 2011

(54) MULTI-PATH ACTIVE HYBRID CIRCUIT

(75) Inventors: Chia-Liang Lin, Union City, CA (US); Pei-Chieh Hsiao, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1865 days.

(21) Appl. No.: 11/099,956

(22) Filed: Apr. 5, 2005

(65) Prior Publication Data

US 2006/0222173 A1 Oct. 5, 2006

(51) Int. Cl.
*H04M 9/08* (2006.01)

(52) U.S. Cl. ......... 379/406.08; 379/406.05; 379/406.13; 379/400; 379/403

(58) Field of Classification Search . 379/406.01–406.16
See application file for complete search history.

(56) References Cited

U.S. PATENT DOCUMENTS

| | | | |
|---|---|---|---|
| 6,208,732 | B1 | 3/2001 | Muschytz et al. |
| 6,925,172 | B2 * | 8/2005 | Sabouri et al. ............ 379/399.01 |
| 2002/0119753 | A1 * | 8/2002 | Digiandomenico et al. .... 455/63 |
| 2002/0151280 | A1 | 10/2002 | Sabouri |
| 2003/0021389 | A1 * | 1/2003 | Hirai et al. ......................... 379/3 |
| 2003/0123650 | A1 | 7/2003 | Oygang |
| 2003/0147526 | A1 | 8/2003 | Oswal et al. |
| 2003/0169806 | A1 | 9/2003 | Warke |
| 2003/0169875 | A1 * | 9/2003 | Lee et al. .................. 379/399.01 |
| 2006/0146738 | A1 * | 7/2006 | Lu ................................. 370/286 |

* cited by examiner

*Primary Examiner* — Fan Tsang
*Assistant Examiner* — Ibraham Sharifzada
(74) *Attorney, Agent, or Firm* — Thomas, Kayden, Horstemeyer & Risley, LLP

(57) ABSTRACT

A hybrid circuit for a full-duplex transceiver includes a two-to-four wire ratio converter (50, Z1, Z2) for forwarding a transmitted signal TX' on a transmission line (41) in response to an input signal TX. The ratio converter also produces a signal RXA in response to a received signal RX arriving on the transmission line, wherein signal RXA includes an echo of input signal TX. A passive filter (H1) and a first active filter (H2) each filter input signal TX to generate signals TXA and TXB summed with the RXA signal to form a signal RXB at the input of an amplifier (52, Z3, Z4) producing an output signal RXC. A second active filter (H3) filters input signal TX to generate a signal TXC summed with the RXC signal to produce the output signal RX. The impedance of the passive filter is designed so that when the transmission line has a target impedance, such as the impedance of an ideal twisted pair, the TXA output signal of the passive filter adequately offsets the TX signal echo in RXA. A control circuit monitors the residual echo in the output signal and, when the transmission line impedance varies from its target value so that the passive filter alone cannot provide adequate echo cancellation, the control circuit turns on the first and/or second active filters to provide additional echo cancellation. The frequency responses of the active filters are adjustable to accommodate a variety of transmission line impedances.

20 Claims, 4 Drawing Sheets

MULTI-PATH ACTIVE HYBRID CIRCUIT

BACKGROUND OF THE INVENTION

1. Field of the Invention

The invention relates to transceivers providing full-duplex communication and in particular to a hybrid circuit for a full-duplex transceiver.

2. Description of Related Art

Conventional modems operating in accordance with an Asymmetrical Digital Subscriber Line (ADSL) standard incorporate an echo canceling hybrid circuit for combining a transmit signal with a receive signal in an ADSL transceiver to enable bidirectional data communication through a two-wire transmission line, such as, for example, an unshielded twist wire pair. The hybrid circuit cancels the echo signal caused by a portion of the transmit signal appearing in the receive signal as noise.

FIG. 1 shows a typical prior art transceiver 10 for forwarding an input signal TX as a transmitted signal TX' to a remote transceiver (not shown) via a transmission line 12, and for generating an output signal RX in response to a received signal RX' arriving on line 12 from the remote transceiver. Transceiver 10 includes an amplifier 11, for amplifying the input TX signal, a summing amplifier 16 for generating the output RX signal, and a hybrid circuit 18 for coupling transmission line 12 to the output of amplifier 11 and the input of amplifier 16. Hybrid circuit 18 includes an impedance element Z1 and a transformer 14 coupling the output of amplifier 11 to line 12. Transformer 14 also couples a non-inverting input of amplifier 16 to line 12. Both the received and transmitted signals RX' and TX' on line 12 appear as components of a signal VIN at the non-inverting input of summing amplifier 16. Hybrid circuit 18 also includes a voltage divider network comprising impedance elements Z2 and Z3 to provide an offset signal VOFF at an inverting input of amplifier 16 to offset the transmitted signal component of the VIN signal. The VOFF signal will cancel the echo of transmitted signal TX' in received signal RX' when Z1/ZL=Z2/Z3, where ZL is the impedance of transmission line 12.

A modem meeting the ADSL standard uses a frequency division duplex (FDD) scheme wherein the transmitted and received signals TX' and RX' on line 12 occupy different frequency bands. For example, for customer premise equipment (CPE) ADSL modem, the transmitted signal occupies the 30 KHz-138 KHz frequency band (the "upstream band") while the received signal occupies the 138 KHz-1.1 MHz frequency band (the "downstream band"). Although the line driver of a CPE modem delivers the transmitted signal over the upstream band, the transmitted signal TX' inevitably introduces some level of noise and distortion extending above 138 KHz and lying in the downstream band of the received signal RX'. Hybrid circuit 18 does not completely cancel the residual echo of transmit signal TX' in output signal RX. One portion of this residual echo resides in the transmitted signal's upstream band, and a remaining portion of the residual resides in the received signal's downstream band. Since the residual echo in the receiver band is indistinguishable from the received signal RX', it can significantly degrade receiver performance.

A filter (a high pass filter in the case of a CPE transceiver) can separate the residual echo in the transmitted band, but if the residual echo is too strong, it can saturate the receiver, particularly its low noise amplifier. Therefore, it is important for a transceiver to include a hybrid circuit providing good echo cancellation to minimize the residual echo in both the upstream and downstream bands. It is not difficult to design a hybrid circuit to provide sufficient echo cancellation in both the transmitter band and the receiver band when line 12 is an ideal twist-pair transmission line. However, a twisted-pair transmission line will often include bridged taps (open-end transmission line stubs) that cause the transmission line impedance to vary significantly with frequency, and the lengths and locations of the bridged taps strongly affect the relationship between transmission line impedance and signal frequency. Designers therefore find it difficult to design a hybrid circuit that can provide good echo cancellation in both the transmitter band and the receiver band that can accommodate a wide variety of transmission line frequency response characteristics. A common solution is to make the impedance element Z3 of hybrid circuit 18 adjustable using several discrete switches to switch resistors and/or capacitors in or out of element Z3 to synthesize an impedance providing a good match to the line impedance.

The following patents describe hybrid circuit topologies addressing transmission line impedance matching problems associated with bridged taps:

U.S. Patent Publication 2003/0147526, filed Aug. 7, 2003 by Oswal et al.

U.S. Patent Publication 2003/0123650, filed Jul. 3, 2003 by Oygang.

U.S. Patent Publication 2003/0169875, filed Sep. 11, 2003 by Lee et al.

U.S. Patent Publication 2003/0169806, filed Sep. 11, 2003 by Warke.

U.S. Pat. No. 6,208,732 issued Mar. 27, 2001 to Muschytz et al.

FIG. 2 illustrates another prior art transceiver 20. An input signal TX drives a differential amplifier 22 driving a transmission line 26 via a hybrid circuit 21 to produce the transmitted signal TX'. Hybrid circuit 21 also couples transmission line 26 to the input of a differential amplifier 28 having feedback provided by impedance elements Z3. Amplifier 28 amplifies the received signal RX' signal arriving from line 26 to produce an output signal RX.

Hybrid circuit 21 includes a transformer 24 having a primary winding coupled to line 26, a secondary winding coupled to the output of amplifier 22 through impedance elements Z1, and another secondary winding coupled to the input of amplifier 28 through impedance elements Z2. Impedance elements Z1 match the nominal impedance of transmission line 26. For example, if the nominal line impedance is 100 Ohms, each impedance element Z1 should be 50 Ohms, assuming the turn ratio of the transformer windings is 1:1 between the transmit (TX) side and the line side of the transformer. Impedance elements Z2 present an impedance much higher than elements Z1 so that the impedance looking into hybrid circuit 21 from line 26 substantially matches the nominal line impedance 2·Z1. In inverting configuration, amplifier 28 acts as a low noise amplifier providing a gain of −Z3/Z2 to the signal arriving on line 26. A passive circuit H1 including series impedance elements H1Z residing between the output of line driver 22 and the input of amplifier 28. The reverse polarity of the differential signal flowing through the passive circuit H1 cancels the echo. If the nominal line impedance is, for example, 100 Ohms and the primary and secondaries of transformer 24 have identical numbers of turns, impedance elements Z1 can be 50 Ohm resistors and impedance element Z2 can be, for example, 1 KOhm. If the output of amplifier 22 is 1V, the voltage coupled to both the line side and the RX side of the transformer 24 will be approximately 0.5V. The echo at the output of amplifier 28 due to the coupling between the transformer secondaries will be 0.5V*Z3/1 KOhm. The signal voltage at the output of amplifier 28 due to the path through passive circuit H1 will be 1V*Z3/H1Z. To provide a good echo cancellation, H1Z should satisfy the following:

0.5V*Z3/1 KOhm=1V*Z3/H1Z.

This implies H1Z should be 2 KOhm. Since the line impedance for an ideal twist-pair transmission is a function of frequency, a simple series resistor implementation of H1 will not provide sufficient echo cancellation. However, a simple $2^{nd}$ order RC network can provide sufficient echo cancellation. In general, if the line driver output is 1V and the line impedance is ZL, then the echo at the output of amplifier 28 due to the coupling between TX side and RX side of the transformer is approximately 1V*ZL/(2*Z1+ZL)*Z3/Z2. The signal at the output of amplifier 28 due to the path through circuit H1 will be 1V*Z3/H1Z. To achieve adequate echo cancellation, the single-end impedance H1Z of passive circuit H1 should satisfy

1V*ZL/(2*Z1+ZL)*Z3/Z2=1V*Z3/H1Z.

This implies

H1Z=Z2*(1+2*Z1/ZL).

The design of H1 becomes more difficult when transmission line 26 includes bridged taps and is therefore not an ideal twisted pair. Since the line impedance ZL is highly frequency dependent for a line 26 having bridged taps, it is not possible to achieve good echo cancellation using simple passive RC networks when line 26 has bridged taps. For a given loop length and bridged tap configuration, it is possible to replace the passive RC network H1 with a high order passive RLC network approximating the impedance Z2*(1+2*Z1/ZL). However, since inductors are expensive compared with other discrete circuit elements it can be preferable to use an active filter in lieu of an RLC network.

FIG. 3 illustrates a prior art transceiver 30 that is similar to transceiver 20 of FIG. 2 except that hybrid circuit 21 of transceiver 30 employs a $2^{nd}$ order active filter circuit HA in place of passive circuit H1 of FIG. 2. FIG. 4 illustrates a prior art $2^{nd}$ order active filter HA of the FIG. 3. In an integrated circuit, an active filter can be a low cost alternative to an expensive discrete RLC network because it can approximate any impedance, provided it does not contain right half plane poles that cause instability. However, an active filter introduces noise into a hybrid circuit, and the noise increases with the order of the filter. When the noise introduced by active filter HA is significant, it undermines the function of the low noise amplifier 28.

The unshielded twisted air transmission line 26 attenuates the received signal originating from the remote transmitter with, for example, a 40 dB loss and the receiver usually requires a few stages of amplification after amplifier 28 to boost the signal level to adequately compensate for the attenuation so that the signal is suitable for signal processing. The signal level sequentially increases from the first stage to the last stage, but each stage of amplification introduces added noise. The added noise is particularly detrimental in the earliest stage(s), since the signal levels are lowest. Therefore, it is important to use low noise amplifiers in the earliest stage(s) of amplification, however the circuit noise added by the introduction of active filter HA in hybrid circuit 30 can undermine the low noise function of amplifier 28. Thus to preserve signal integrity, active filter HA should be designed for low noise, but a low noise active filter is difficult to design, particularly when the order of the filter is high.

What is needed is a hybrid circuit architecture for use in connection with transmission lines having a variety of frequency-dependant impedances that does not require expensive RLC networks and that employs only easily designed, low noise, low order, active filters.

BRIEF SUMMARY OF THE INVENTION

A hybrid circuit in accordance with the invention for a full-duplex transceiver includes a two-to-four wire ratio converter for forwarding a transmitted signal TX' on a transmission line in response to an input signal TX. The ratio converter also produces a signal RXA in response to a received signal RX arriving on the transmission line, wherein signal RXA includes an echo of input signal TX.

A passive filter and a first active filter each separately process input signal TX to generate signals TXA and TXB summed with the RXA signal to form a signal RXB at the input of an amplifier producing an output signal RXC. A second active filter filters input signal TX to generate a signal TXC summed with the RXC signal to produce output signal RX. The impedance of the passive filter is designed so that when the transmission line has target impedance, such as the impedance of an ideal twisted pair, the TXA output signal of the passive filter adequately offsets the TX signal echo in RXA.

A control circuit monitors the residual echo in the output signal and, when the transmission line impedance varies from its target value, so that the passive filter alone cannot provide adequate echo cancellation, the control circuit turns on the first and/or second active filters to provide additional echo cancellation. The frequency responses of the active filters are adjustable to accommodate a variety of transmission line impedances. The control circuit turns the active filters off when they are not needed, thereby preventing them from adding noise to the output signal.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

The invention relates a hybrid circuit for a full-duplex transceiver. While the specification below and the drawings depict examples of hybrid circuits in accordance with preferred embodiments of the invention, those of skill in the art will appreciate that invention may be incorporated into a variety of hybrid circuit designs.

Figure 5:
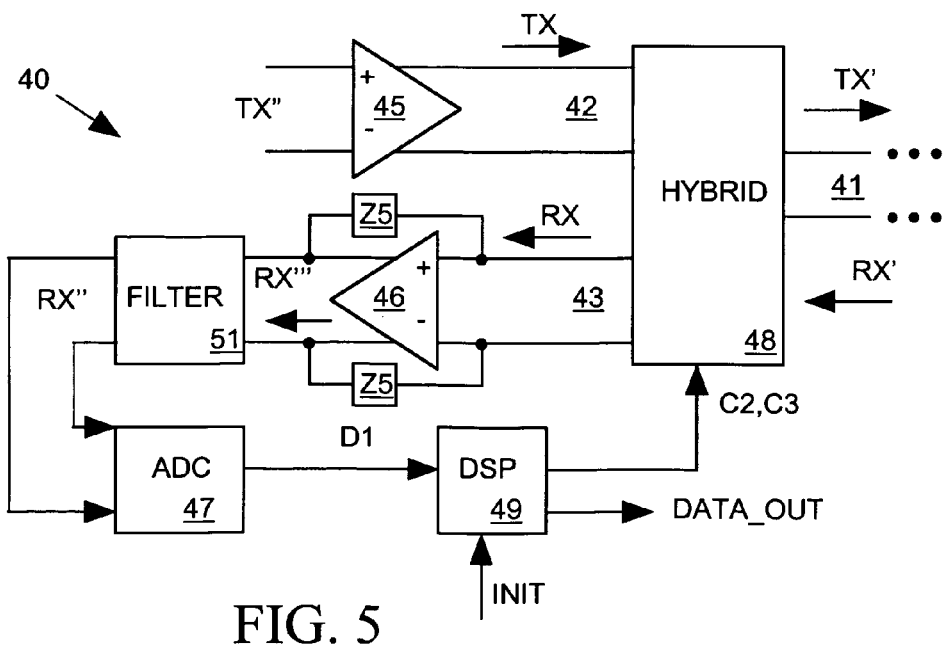
FIG. 5 is a schematic diagram of a full-duplex receiver in accordance with an example embodiment of the invention.

FIG. 5 illustrates an example full-duplex transceiver 40 for communicating with a remote transceiver (not shown) via a transmission line 41. Transceiver 40 sends transmitted signal TX' conveying data to the remote transceiver in response to an input signal TX" and produces output data (DATA_OUT) to representing data conveyed by a received signal RX' arriving from the remote transceiver. Transceiver 40 includes a differential amplifier 45 for amplifying input signal TX" to produce a signal TX input port 42. A hybrid circuit 48 in accordance with the invention couples an input port 42 conveying the TX signal to transmission line 41 and produces the transmitted signal TX' in response to its TX signal input. Hybrid circuit 48 also couples transmission line 41 to a output port 43 and generates a signal RX on an output port 42 in response to the received RX' arriving on transmission line 41. A differential amplifier 46 amplifies the RX signal to produce an output signal RX''', and a filter 51 attenuates the transmit band of the RX''' signal to produce an output signal RX". A pair of impedance elements Z5 provide feedback for amplifier 46. An analog-to-digital converter (ADC) 47 digitizes the RX" signal to produce a data sequence D1 representing a succession of sampled magnitudes of the RX" signal output of filter 51, and a digital signal processing (DSP) circuit 49 processes the D1 sequence to produce the DATA_OUT sequence along with control data C2 and C3. As described below, control data C2 and C3 control operating characteristics of hybrid circuit 48.

Figure 6:
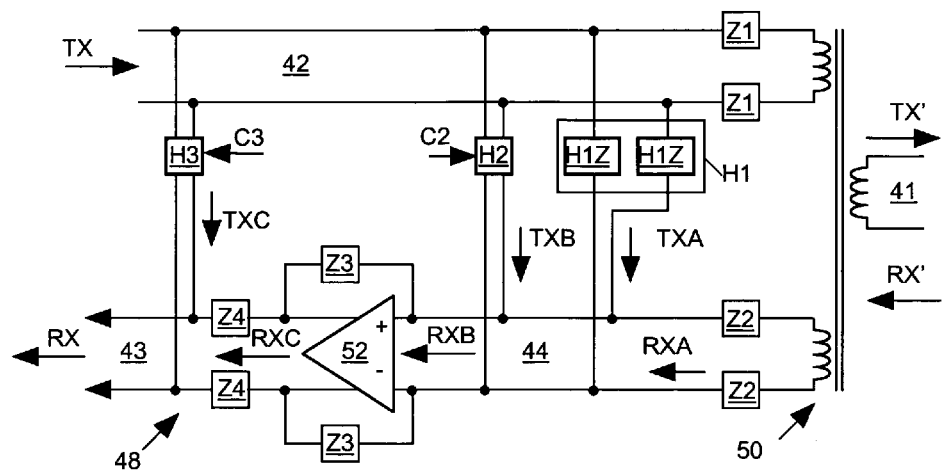
FIG. 6 is a schematic diagram illustrating an example embodiment of the hybrid circuit of FIG. 5.

FIG. 6 depicts an example implementation of hybrid circuit 48 of FIG. 5 including a transformer 50 having a primary winding coupled to transmission line 41, a secondary winding coupled to input port 42 through impedance elements Z1, and another secondary winding coupled to the input of a differential amplifier 52 through impedance elements Z2 to the input node 44 of amplifier 52. Transformer 50 produces a signal RXA on the input node 44 in response to the received signal RX' arriving on transmission line 41. Impedance elements Z4 connect the output of amplifier 52 to output port 43 of FIG. 5, and impedance elements Z3 provide feedback for amplifier 52.

Since transformer 50 also couples input port 42 to the input node 44 of amplifier 52 through its secondary windings, the RXA signal supplied by transformer 50 will include an echo of the hybrid circuit's input signal TX. A passive filter H1 and an active filter H2 both filter input signal TX to produce signals TXA and TXB that are summed with the RXA signal at the input of amplifier 52 to help cancel the TX signal echo in the amplifier's output signal RXC. An active filter H3 also filters the TX signal to produce another signal TXC summed with the amplifier output signal RXC to produce the hybrid circuit's output signal RX. The TX signal helps to cancel any residual echo of the TX signal in the RXC signal. Control data C2 from DSP 49 of FIG. 5 turns active filter H2 on when the TXB signal is needed to provide echo cancellation by connecting it to its power supply, and turns active filter H2 off when the TXB signal isn't needed. The control data C3 similarly turns on active filter H3 when the TXC signal is needed. Control data C2 and C3 also control the response of filters H2 and H3 when they are on so as to minimize the TX signal echo in output signal RX.

Passive filter H1 includes two series impedance elements H1Z coupling transmission lines 42 and 44, wherein ZL/$(2*Z1+ZL)*Z3/Z2=Z3/H1Z$. ZL is a selected "target" impedance for transmission line 41. For example, impedance ZL may be the impedance of transmission line 41 if were an ideal twisted-pair loop having no bridged taps. Since RC elements chosen to synthesize impedance H1Z can achieve adequate echo cancellation for such a transmission line, control data C2 and C3 can turn off active filters H2 and H3 when the transmission line 41 has the target impedance. Turning off active filters H2 and H3 when they are not needed is advantageous because it eliminates them as a source of circuit noise.

When transmission line 41 has one or more bridged taps, the line impedance may substantially deviate from its target impedance, and passive filter H1 alone may not provide sufficient echo cancellation. In such case, DSP circuit 49 of FIG. 5 sets control data C2 and C3 to turn on active filter H2 and/or H3 to help cancel the residual echo.

Figure 1:
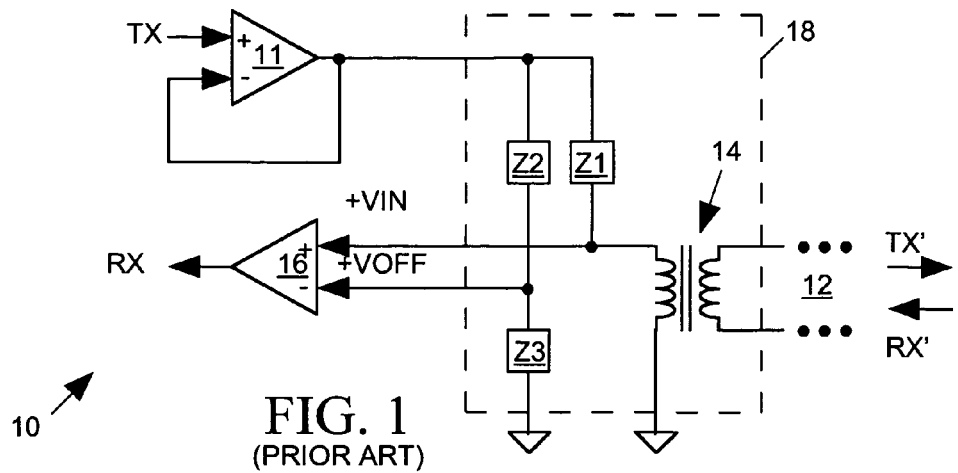
FIGS. 1-3 are schematic diagrams illustrating transceivers employing prior art hybrid circuits.
Figure 2:
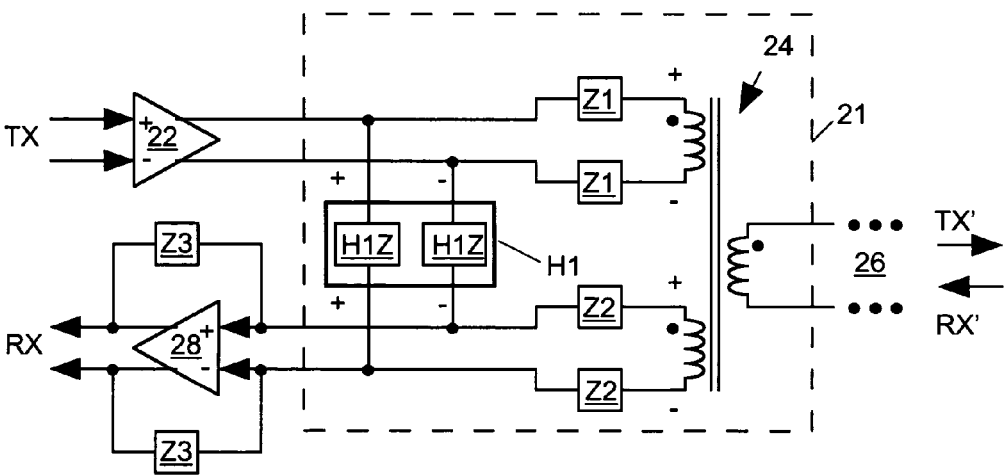
Figure 3:
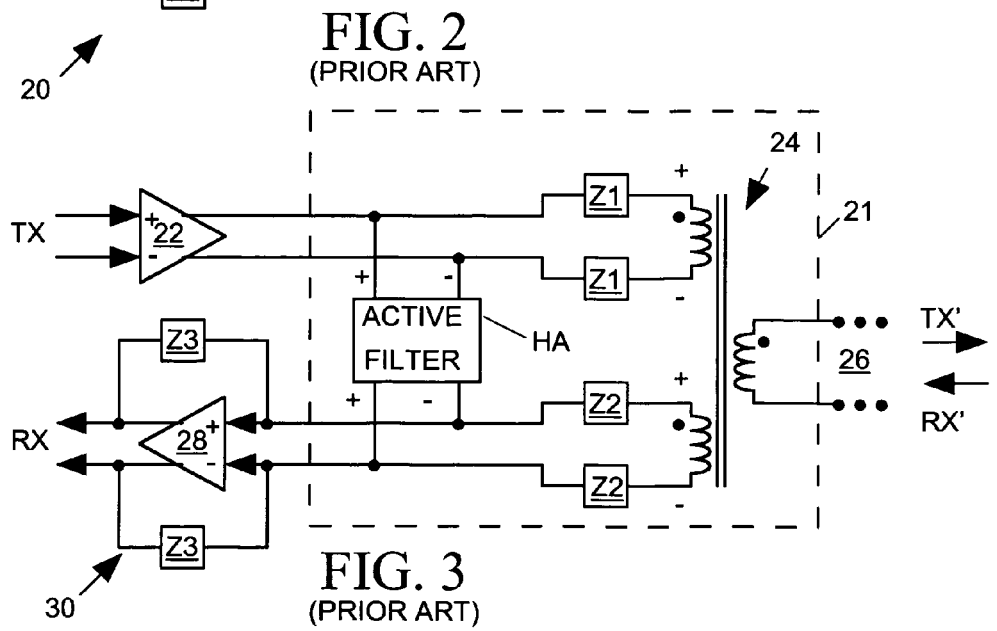
Figure 4:
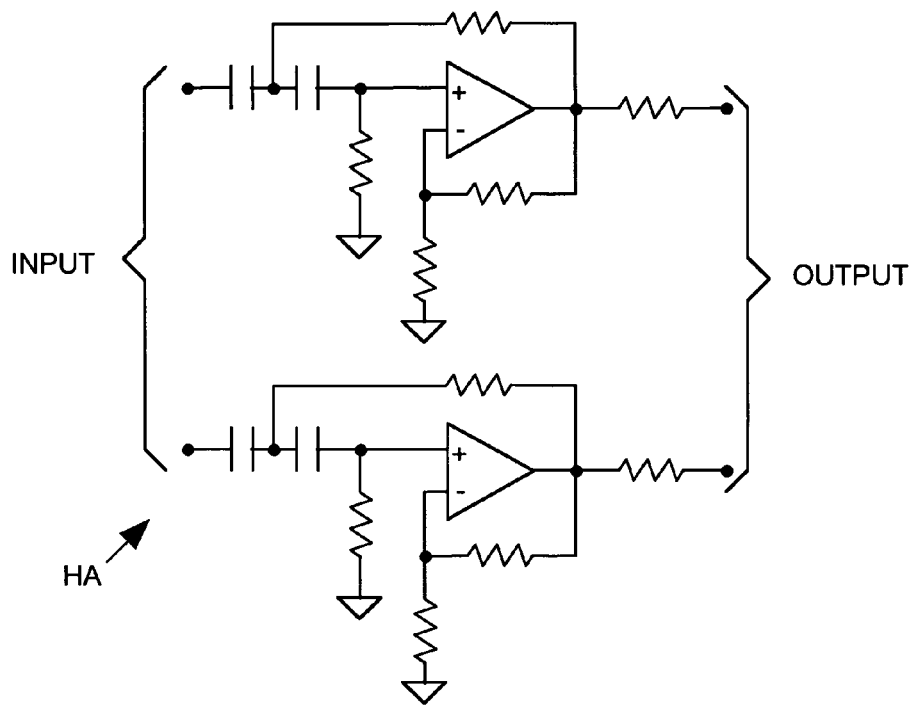
FIG. 4 is a schematic diagram of a prior active filter of the FIG. 3.

Although it is necessary to provide a low noise design for active filter for H2, the design difficulty is minimized because the filter can be of a lower order than needed in the prior art single-path architecture of the hybrid 21 of FIG. 3. The noise restrictions on filter H3 are less severe because amplifier 52 boosts the signal level so that amplifier 46 of FIG. 5 can tolerate a higher level of noise added by active filter H3. Both amplifiers 46 and 52 are adjustable gain amplifiers, and the gain of amplifier 52 should be adjusted first to the highest level possible without saturating its output. Then, the gain of amplifier 46 should be adjusted to the highest level possible without saturating its output.

ADC 47 of FIG. 5 periodically digitizes the RX" signal to produce a data sequence D1 representing successive magnitudes of RX". During an initial calibration process initiated by an INIT signal, DSP circuit 49 processes the D1 sequence to determine the amount of the TX echo in output signal RX", and sets data C2 and C3 to turn on active filters H2 and/or H3 on and appropriately adjust their responses when passive filter H1 alone does not provide sufficient echo cancellation.

Figure 10:
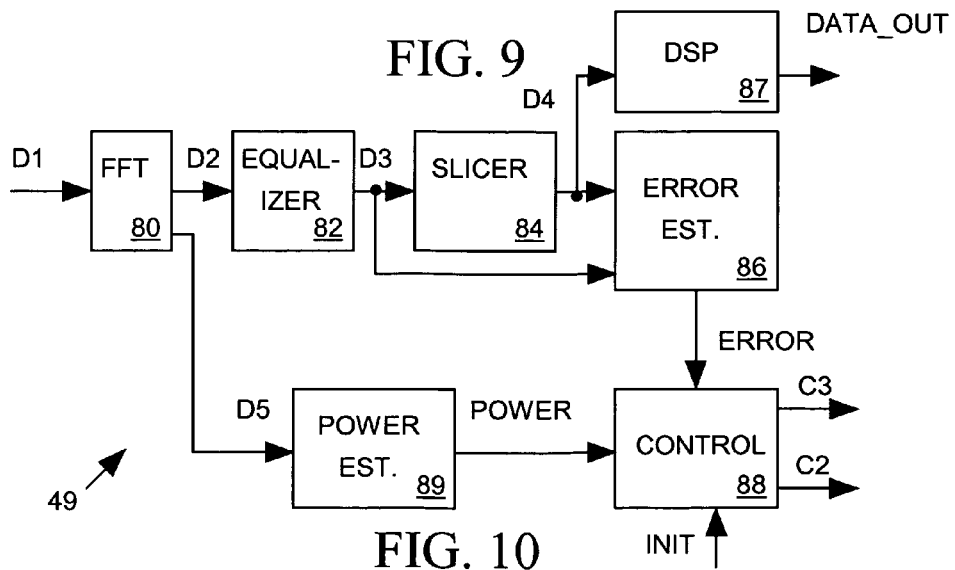
FIG. 10 is a block diagram illustrating an example embodiment of the DSP circuit of FIG. 5.

FIG. 10 illustrates DSP circuit 49 of FIG. 5 in more detailed block diagram form. DSP circuit 49 includes a fast Fourier transform (FFT) engine 80 for processing the D1 sequence to produce a second data sequence D2 representing the receive band of the digitized RX" signal in the frequency domain subcarriers (or tones). Each subcarrier of FFT 80 output in the receive band (i.e. downstream band for customer premise equipment), contains both the desired receive signal and the residual echo error. A per-subcarrier equalizer 82 processes the second data sequence D1 to produce a third data sequence D3 that is compensated for the amplitude change and phase shift suffered by the desired receive signal caused by transmission line 45 to restore the receive signal to the original amplitude and phase as transmitted by the remote transmitter. A per-subcarrier slicer 84 quantizes data signal D3 to produce a data sequence D4 representing a most likely constellation point, which is the amplitude and phase transmitted by the remote transmitter. Additional DSP circuitry 87 processes the D4 data in a well-known manner to produce the DATA_OUT sequence.

When there is no echo in the receive band of RX" signal, the slicer error (the difference between the equalizer output sequence D3 and the slicer output sequence D4) is very small, and the detected RX signal, once equalized at the output of equalizer 82, will be very close to an ideal quantization level representing the information sent by the remote transmitter. The presence of echo in the RX" signal will make the slicer error larger. Circuit 86 produces error data (ERROR) that is proportional to the residual echo in the receive (downstream) band based on the difference between the slicer's input and output sequences D3 and D4. During an initialization procedure carried out when the INIT signal is asserted, control circuit 88 turns on active filter H3 only if the slicer error exceeds an acceptable threshold level and then iteratively adjusts the response of active filter H3 by adjusting the value of control data C3 to minimize the slicer error, thereby to minimize the residual echo the RX" signal in the receive (downstream) band.

FFT 80 also processes the D1 sequence to produce another data sequence D5 representing transmit band of the digitized RX" signal in the frequency domain. Another circuit 89 processes the D5 sequence to produce POWER data representing an estimate the residual echo in the transmit band (the upstream band in customer premise equipment). During the initialization process, control circuit 88 sets control data C2 to turn on active filter H2 only if the power of the transmit (upstream) band exceeds an acceptable threshold level, and then iteratively adjusts the response of active filter H2 to minimize the power level in the transmit (upstream) band by iteratively adjusting the value of control data C2.

Figure 7:
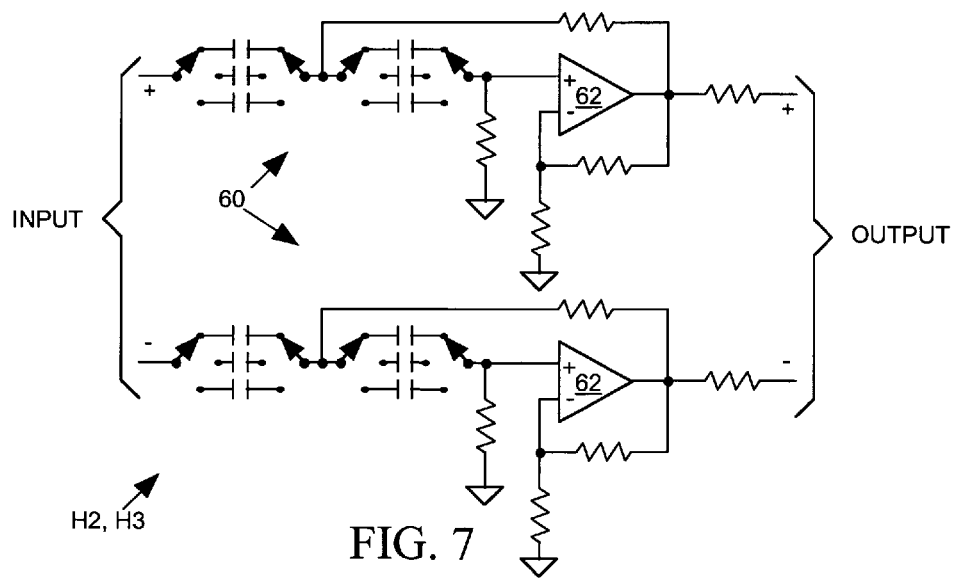
FIG. 7 is a schematic diagram illustrating an example embodiment of an active filter suitable for use in the hybrid circuit of FIG. 5.

FIG. 7 illustrates an example active filter implementing either filter H2 or H3, though those of skill in the art will appreciate that other active filter architectures can implement filters H2 and H3. In this example, filter H2 or H3 includes an RC network 60 for delivering its input signal to a pair of amplifiers 62 for producing the filter output signal supplied to amplifier 52 of FIG. 6. RC network 60 includes banks of switched capacitors of varying size in series with the amplifier 62 inputs. The C2 or C3 control data from DSP circuit 49 adjusts the frequency response of active filters H2 and H3 by controlling the switches that select the series capacitance.

Figure 8:
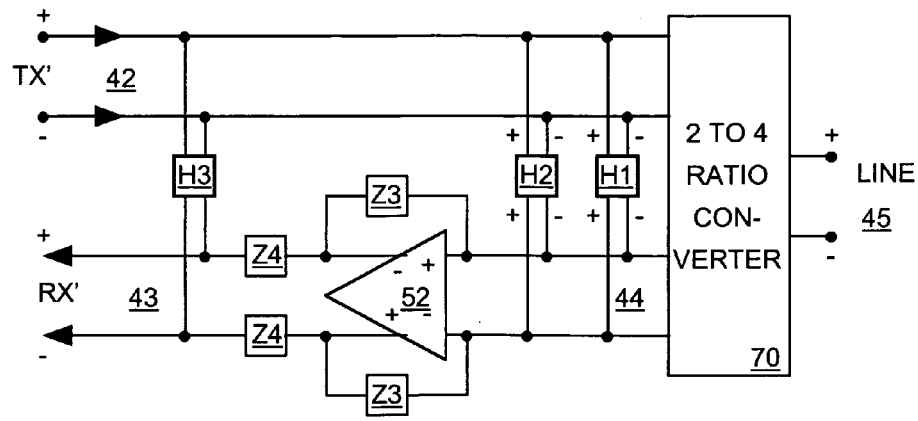
FIG. 8 is a schematic diagram illustrating an example of a hybrid circuit in accordance with the invention.
Figure 9:
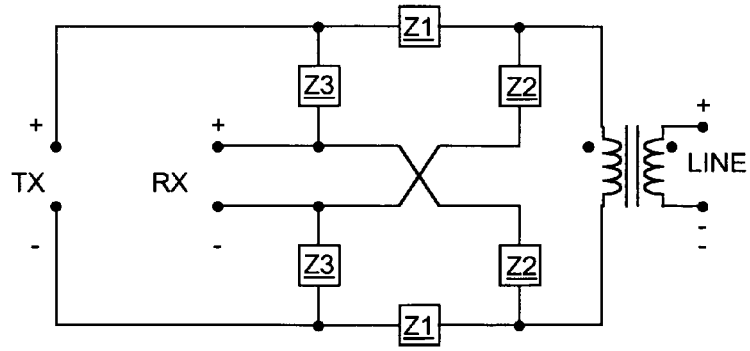
FIG. 9 is a schematic diagram illustrating an example two-to-four ratio converter.

A two-to-four wire ratio converter provides an impedance-matched interface between the two wires on the line side and the four wires (two for TX and two for RX) on the transceiver side. Although the hybrid circuit of FIG. 6 employs two-to-four wire ratio converter including a transformer 50 and impedance elements Z1 and Z2, other two-to-four wire ratio converter configurations are known. Thus, as shown in FIG. 8, the hybrid circuit of FIG. 6 can include any kind of two-to-four wire ratio converter 70. FIG. 9 illustrates another example two-to-four wire ratio converter architecture suitable for implementing the two-to-four wire ratio converter 70 of FIG. 8.

Although the invention has been illustrated above as being used in connection with an example frequency division duplex (FDD) system, those of skill in the art will appreciate that the invention can be used in other full duplex systems. For example, the invention can be applied to full duplex systems where the transmitter and receiver bands overlap.

The invention claimed is:

1. An apparatus for providing an interface between a transmission line, an input port, and an output port, the apparatus comprising:
    a ratio converter for producing a transmitted signal on the transmission line in response to an input signal arriving on the input port, and for producing a first signal in response to a received signal arriving on the transmission line, wherein the first signal includes an echo of the input signal;
    a first filter for filtering the input signal to produce a second signal;
    a second filter for filtering the input signal to produce a third signal, the second filter being an active filter that can be selectively turned off by a control signal;
    an amplifier circuit for summing and amplifying the first, second and third signals that form a fourth signal at an input to the amplifier circuit to produce a fifth signal at an output of the amplifier circuit;
    a first circuit for monitoring a processed version of an output signal provided from the output port to estimate a magnitude of a residual echo of the input signal in the output signal, and for generating the control signal to selectively turn the second filter on or off depending on the estimated magnitude of the residual echo; and
    a third filter coupled between the input port and the output port, the third filter for generating a sixth signal in response to the input signal, wherein the fifth and sixth signals combine to form the output signal at the output port.

2. The apparatus in accordance with claim 1 wherein the ratio converter comprises:
    at least one first impedance element;
    at least one second impedance element; and
    a transformer having a primary winding coupled to the transmission line, a first secondary winding coupled to the input port through the at least one first impedance element, and a second secondary winding coupled to the amplifier circuit though the at least one second impedance element.

3. The apparatus in accordance with claim 1 wherein the amplifier circuit comprises:
    an amplifier having at least one input for receiving the fourth signal,
    at least one third impedance element coupling the amplifier's input to its output, and
    at least one fourth impedance element coupling the amplifier's output to the output port.

4. The apparatus in accordance with claim 1 wherein the second filter has an adjustable frequency response.

5. The apparatus in accordance with claim 4 wherein the first filter has an impedance and the second filter has a frequency response selected such that the second signal and third signals minimize the echo of the input signal in the fifth signal.

6. The apparatus in accordance with claim 1 wherein the first filter has impedance selected such that the second signal substantially matches an echo of the input signal in the first signal when the transmission line has a target transmission line impedance.

7. The apparatus in accordance with claim 6 wherein the second filter has an adjustable frequency response adjusted so that a sum of the second and third signals substantially matches the echo of the input signal in the first signal when the transmission line has an impedance other than the target transmission line impedance.

8. The apparatus in accordance with claim 6 wherein the ratio converter comprises:
    at least one first impedance element;
    at least one second impedance element; and
    a transformer coupled to the transmission line, coupled to the input port through the at least one first impedance element, and coupled to the amplifier circuit through the at least one second impedance element.

9. The apparatus in accordance with claim 8 wherein the amplifier circuit comprises:
    an amplifier having at least one input for receiving the fourth signal,
    at least one third impedance element coupling the amplifier's input to its output, and
    at least one fourth impedance element coupling the amplifier's output to the output port.

10. The apparatus in accordance with claim 1 wherein at least one of the second and third filters has an adjustable frequency response.

11. The apparatus in accordance with claim 1 wherein the transmitted signal resides in a first frequency band and the received signal resides in second frequency band differing from the first frequency band, and wherein the first circuit is configured to:

monitor the processed version of the output signal to estimate a magnitude of a first residual echo of the input signal in the output signal, monitor the processed version of the output signal to estimate a magnitude of a second residual echo in the output signal within the first frequency band, selectively turn the second filter on or off depending on the estimated magnitude of the first residual echo, and selectively turn the third filter on or off depending on the estimated magnitude of the second residual echo.

12. The apparatus in accordance with claim 11 wherein the first filter has an impedance such that the second signal substantially matches the echo of the input signal in the first signal when the transmission line has a particular target impedance, wherein the second filter has a frequency response adjusted such that a sum of the second and third signals substantially matches the echo of the input signal in the first signal when the transmission line has other than the particular target impedance, and wherein the third filter has a frequency response adjusted such that the sixth signal substantially matches a residual echo of the input signal in the second frequency band of the fifth signal.

13. The apparatus in accordance with claim 1 wherein the ratio converter comprises:

at least one first impedance element;

at least one second impedance element; and a transformer having a primary winding coupled to the transmission line, a first secondary winding coupled to the input port through the at least one first impedance element, and a second secondary winding coupled to the amplifier circuit though the at least one second impedance element.

14. The apparatus in accordance with claim 13 wherein the amplifier circuit comprises:

an amplifier having an input for receiving the fourth signal;

at least one third impedance element coupling the amplifier's input to its output; and at least one fourth impedance element coupling the amplifier's output to the output port.

15. The apparatus in accordance with claim 11 wherein the first circuit comprises a digitizer for digitizing the processed version of the output signal to produce a first data sequence, a Fourier transform engine for processing the first data sequence to produce a second data sequence representing the processed version of the output signal in the frequency domain, an equalizer for processing the second data sequence to produce a third data sequence, a slicer for quantizing the third data sequence to produce a fourth data sequence, a second circuit for producing error data that is proportional to a residual echo in the output signal based on a difference between the third and fourth data sequences, and a third circuit for monitoring the third data sequence to estimate a magnitude of a first residual echo of the input signal in the output signal, for monitoring the error data to estimate a magnitude of a second residual echo in the output signal within the first frequency band, for selectively turning the second filter on or off depending on the estimated magnitude of the first residual echo, and for selectively turning the third filter on or off depending on the estimated magnitude of the second residual echo.

16. The apparatus in accordance with claim 15 wherein the first filter has an impedance such that the second signal substantially matches the echo of the input signal in the first signal when the transmission line has a particular target impedance, wherein the third circuit iteratively adjusts a frequency response of the second filter when the second filter is on such that a sum of the second and third signals substantially matches the echo of the input signal in the first signal when the transmission line has other than the particular target impedance, and wherein the third circuit iteratively adjusts a frequency response of the third filter when the third filter is on such that the sixth signal substantially matches a residual echo of the input signal in the second frequency band of the fifth signal.

17. A method for providing an interface between a transmission line, an input port and an output port, the method comprising the steps of:

producing a transmitted signal on the transmission line in response to an input signal arriving on the input port;

producing a first signal in response to received signal arriving on the transmission line, the first signal including an echo of the input signal;

filtering the input signal to produce a second signal;

filtering the input signal to produce a third signal according to a frequency response selected, said filtering being selectively performed depending on an estimated magnitude of a residual echo;

amplifying a sum of the first, second and third signals that form a fourth signal to produce a fifth signal as a component of an output signal at the output port; and filtering the input signal to produce a sixth signal as a second component of the output signal at the output port.

18. The method in accordance with claim 17 wherein the second signal substantially matches an echo of the input signal in the first signal when the transmission line has target transmission line impedance, and wherein a sum of the second and third signals substantially matches the echo of the input signal in the first signal when the transmission line has an impedance other than the target transmission line impedance.

19. The method in accordance with claim 17 wherein the transmitted signal resides in a first frequency band and the received signal resides in second frequency band differing from the first frequency band.

20. The method in accordance with claim 17 wherein the fifth signal substantially matches a residual echo of the input signal in the fourth signal.

* * * * *